(12) United States Patent
Kenny et al.

(10) Patent No.: US 7,256,728 B1
(45) Date of Patent: Aug. 14, 2007

(54) AIRCRAFT AVOIDANCE SYSTEM FOR PROHIBITING AN AIRCRAFT FROM ENTERING AN EXCLUSION ZONE

(76) Inventors: Craig Anthony Kenny, 8 Masters Street, Newstead, QLD 4006 (AU); Gary John Rushton, 8 Masters Street, Newstead, QLD 4006 (AU); Gregory John Litster, 8 Masters Street, Newstead, QLD 4006 (AU)

( * ) Notice: Subject to any disclaimer, the term of this patent is extended or adjusted under 35 U.S.C. 154(b) by 249 days.

(21) Appl. No.: 10/801,953

(22) Filed: Mar. 17, 2004

Related U.S. Application Data

(63) Continuation of application No. PCT/AU02/01146, filed on Sep. 17, 2002.

(30) Foreign Application Priority Data

Sep. 17, 2001 (AU) .................................. PR7720

(51) Int. Cl.
*G01S 13/91* (2006.01)
*G01S 13/88* (2006.01)
*G08B 23/00* (2006.01)
*G01S 13/93* (2006.01)
*G01S 13/00* (2006.01)

(52) U.S. Cl. .................. 342/36; 342/29; 342/30; 342/32; 342/37; 342/61; 342/63; 342/165; 342/173; 342/175; 342/195; 701/3; 701/120; 701/122; 340/945; 340/963; 340/971; 340/979

(58) Field of Classification Search ............ 342/29–51, 342/61–65, 175, 195, 165–174; 340/945, 340/963–981; 701/1–18, 120–122, 200, 701/207–223, 300, 301
See application file for complete search history.

(56) References Cited

U.S. PATENT DOCUMENTS

| | | | | |
|---|---|---|---|---|
| 4,706,198 | A * | 11/1987 | Thurman ................. | 701/120 |
| 5,416,713 | A * | 5/1995 | Kameda et al. .......... | 701/208 |
| 5,631,640 | A * | 5/1997 | Deis et al. .............. | 342/29 |
| 5,867,804 | A * | 2/1999 | Pilley et al. ............. | 701/120 |
| 6,064,939 | A * | 5/2000 | Nishida et al. .......... | 701/120 |
| 6,133,867 | A * | 10/2000 | Eberwine et al. ........ | 342/29 |
| 6,161,063 | A | 12/2000 | Deker | |
| 6,173,219 | B1 * | 1/2001 | Deker ..................... | 701/3 |
| 6,606,553 | B2 * | 8/2003 | Zobell et al. ............ | 701/120 |
| 6,744,382 | B1 * | 6/2004 | Lapis et al. ............. | 340/971 |
| 2003/0055540 | A1 * | 3/2003 | Hansen ................... | 701/3 |

* cited by examiner

*Primary Examiner*—Bernarr E. Gregory
(74) *Attorney, Agent, or Firm*—Shoemaker and Mattare

(57) ABSTRACT

The present invention relates to an avoidance system and method for directing an aircraft away from an exclusion zone. The exclusion zone may be any three dimensional space for example about a building or city. The avoidance system uses a constant signal from a ground based transmitter and an aircraft's receiver which receives and processes the signal and activates the avoidance system by engaging the flight director system or autopilot to steer away from the exclusion zone.

15 Claims, 6 Drawing Sheets

AIRCRAFT AVOIDANCE SYSTEM FOR PROHIBITING AN AIRCRAFT FROM ENTERING AN EXCLUSION ZONE

This application is a continuation of international application PCT/AU02/01146, filed Sep. 17, 2002.

FIELD OF THE INVENTION

This invention relates to a system of controlling an aircraft's flight parameters to steer the aircraft away from an exclusion zone. The invention has particular but not exclusive application where the exclusion zone encompasses a multi-story building.

PRIOR ART

Most commercial and military aircraft are equipped with a collision avoidance system. In the early 1990s aircraft were equipped with a Traffic Alert and Collision Avoidance System (TCAS) which is an airborne radio system that locates and tracks the progress of aircraft equipped with beacon transponders. With this system, the relative positions of nearby aircraft were tracked by the onboard TCAS computer and displayed in the tracking aircraft's cockpit. Alternative collision avoidance systems (U.S. Pat. No. 5,872,526) were developed using information from an onboard global positioning system (GPS) receiver, broadcasting location information to other aircraft and receiving and displaying information from other aircraft.

While collision avoidance systems have been developed for aircraft—aircraft collisions, there has been little development of avoidance systems for aircraft—stationary object collisions. A collision avoidance system for preventing aircraft to aircraft collisions and aircraft to stationary objects or terrain collisions has been described in U.S. Pat. No. 6,133,867. The basis of the collision avoidance system is the exchange of position and motion data on a periodic basis between aircraft or between an aircraft and a ground or stationary object. Each aircraft calculates their own position and flight path details with respect to standard reference points by using positioning systems such GPS and transmits this information to another aircraft or ground station. Transmitters associated with stationary objects transmit an object ID and a minimum safe altitude. The transmitters associated with terrain features such as mountains may transmit a packet of information that contains latitude, longitude, minimum safe altitude, correction data, and a radius of applicable minimum safe altitude. In these situations the ground station processes received information and transmits new information.

Each aircraft processes the received information and the pilot or autopilot alters the aircraft's course with respect to the processed results. Where the aircraft receives too much information, the aircraft reduces the radius from which it receives and processes the transmitted information to avoid overload.

OBJECT OF THE INVENTION

It is an object of the present invention to provide an aircraft avoidance system for prohibiting an aircraft from entering an exclusion zone.

SUMMARY OF THE INVENTION

According to one aspect, the invention broadly resides in an avoidance system for steering an aircraft away from an exclusion zone including transmitter means for transmitting a signal to the aircraft, said signal includes transmitter means identification and exclusion zone information; and aircraft receiver means for receiving and processing said signal, said aircraft receiver means is operationally associated with a flight director system which is programmed to control and steer the aircraft; wherein a received transmitter means signal is processed and the flight director system is engageable in accordance with said aircraft's flight profile and processed exclusion zone information to control and steer the aircraft away from the exclusion zone.

In another aspect, the invention broadly resides in an avoidance system for steering an aircraft away from an exclusion zone including transmitter means for transmitting a signal to the aircraft, said signal includes transmitter means identification and exclusion zone information; and aircraft receiver means for receiving and processing said signal, said aircraft receiver means is operationally associated with a flight director system which is programmed to control and steer the aircraft; wherein a received transmitter means signal is processed and the flight director system is engaged in accordance with said aircraft's flight profile and processed exclusion zone information to control and steer the aircraft away from the exclusion zone.

Said aircraft's flight profile is defined as a dynamic description of the aircraft's capabilities based on calculations including (but not limited to) the type of aircraft, current load, current velocity of the aircraft and current operational status of the aircraft.

The transmitter means transmits a signal preferably outward to a predetermined distance or radius in a particular direction. The transmitter means signal is preferably a constant signal containing the same exclusion zone information irrespective of the position of the aircraft. If an aircraft travels within the radius it can receive the transmitter means signal. If an aircraft receives the transmitter means signal, the avoidance system on board the aircraft is activated in accordance with the exclusion zone information and said aircraft's flight profile. The flight director system is engaged at a time and manner calculated from the processed signal. If the aircraft moves away from the exclusion zone the flight director system may not be engaged because of the change to the aircraft's flight profile. When the flight director system is engaged it controls and steers the aircraft. The avoidance system on board the aircraft preferably can not be overridden and preferably remains engaged until the aircraft moves out of range of the signal or at a calculated position or time from the exclusion zone.

The exclusion zone preferably has one or more outer warning zones where an alarm is activated when the aircraft enters the warning zone. In one embodiment there is a peripheral warning zone where an audible warning is sounded in the cockpit of an aircraft passing through the zone and an inner warning zone where an audio and visual alarm is activated in the cockpit of the trespassing aircraft.

The exclusion zone maybe defined by a perimeter about the transmitter means set at a predetermined radial distance from the transmitter means. The exclusion zone may take the form of a substantially semicircular volume about a transmitter means. Alternatively the exclusion zone may be any three dimensional shape whose coordinates are described by the exclusion zone information. The exclusion zone may be defined spatially by at least four coordinates where each coordinate has a longitudinal, latitudinal and altitude parameter. With four coordinates any desired three dimensional shape can be defined. A spatially defined exclusion zone can define a three dimensional shape about a building or a group of buildings. In this alternative embodiment the signal preferably extends beyond the outer warning zones so that the signal can be processed and the avoidance programs activated before the aircraft enters the outer warning zones.

The exclusion zone information preferably serves as an activation signal for the onboard avoidance system which includes the flight director system and provides coordinated description of the exclusion zone.

The transmitter means is preferably a transmitting beacon capable of sending a complex signal containing two or more different datum. The beacon will preferably have one or more supervisory receivers located within the perimeter of the exclusion zone to detect whether the transmitting beacon is transmitting the signal. More preferably there is at least one supervisory beacon on or adjacent the transmitting beacon. The supervisory receivers preferably transmit to the relevant authority the status of the transmission from the transmitting beacon.

The signal transmitted from the transmitting beacon is preferably encrypted and transmitted over one or more frequencies. In one preferred embodiment, the signal is transmitted in a direct sequence spread spectrum (DSSS) which divides the signal in parts and transmits the parts over a band of frequencies.

The aircraft receiver means includes a signal receiver and a processor with avoidance software for processing the signal and activating the avoidance programs. The term receiver includes transceiver which serves to receive and transmit signals and is an alternative to having a separate receiver and transponder. The processing of the signal also requires the current flight profile and current position of the aircraft. The current position of the aircraft may be determined by the onboard GPS. The processor preferably calculates the position when the flight director system is activated and what course the flight director system sets when it is activated.

From calculations of the aircraft's flight profile and proximity to the exclusion zone, the aircraft receiver means will preferably determine at what position relative to the exclusion zone the aircraft's flight director system will be engaged to steer the aircraft on a calculated course away from entering the exclusion zone. The avoidance action is preferably initiated at a time and distance that enables the aircraft to move away using normal operational procedures without entering the exclusion zone space. The flight director system of each aircraft will take control of the aircraft at comparatively different times as the flight profile of each aircraft is different. In one form the avoidance action includes moving the aircraft in an upward direction while preferably providing the pilot with limited sideways maneuverability.

Preferably an alert signal is transmitted from the aircraft when a transmitter means signal has been received and processed to inform the relevant authorities of the situation. The alert signal preferably includes the aircraft identification, beacon identification and exclusion zone information for the beacon.

Where there are two or more signals received by the aircraft receiver means, the signals are preferably processed concurrently and a single larger exclusion zone incorporating the two zones encoded by the signals is calculated.

When the signal transmitted from the transmitting beacon is not recognized or the full signal is not received because of jamming or some other form of tampering, the aircraft receiver means will preferably immediately engage the flight director system to take appropriate action.

In order to avoid possible problems with landing at airports or any other desired location, the avoidance program will preferably include a protocol where the avoidance system is not operational. Preferably coordinates of airports or their runways are entered into the avoidance programs as zones where the avoidance system is not operational. This information is preferably installed as part of the avoidance programs with a facility to update, amend or add new zones. The checking of these coordinates may be part of the initializing of the avoidance system during the preparation for flight. In conjunction with input from the onboard GPS, the avoidance system is non-operational when the aircraft enters the programmed zones.

To address the possibility of disablement of the onboard receiver means during flight, the avoidance system may include a self checking means where a low power beacon is installed on the aircraft to transmit a signal periodically to test the operational status of the receiver means to accept the signals from the transmitting beacon. The self checking means determines whether the receiver means is capable of receiving signals. If there is a failure in the avoidance system during flight, the aircraft sends an alert signal to the relevant authorities advising them of the non-operational status of the avoidance system.

An initial check of the avoidance system preferably forms part of the preparation for flight. The initial check may be performed with the low power beacon on the aircraft or a ground based transmitter which transmits a signal to identify the avoidance system and check its status to determine whether or not it is operational. In the event of a failure of the receiver means during the preflight check, a signal will be sent from the aircraft and or ground based transmitter to the relevant authority with advice as to the status of the receiver means and the flight director system will be engaged to prevent the aircraft from taking off.

The avoidance system may also provide for notification by a satellite based system to receive registered exclusion zone parameters passed directly to the flight director by another independent sub system. The use of a satellite-based system provides a back up when there is a receiver means failure on the aircraft. The relevant authorities will be notified of the aircraft's current flight path and then conduct a database search to identify any exclusion zones ahead in the flight path. The exclusion zone coordinates would then be sent via satellite to the aircraft's flight director via another independent onboard sub-system to allow activation of the avoidance system. The exclusion zone may already exist in a flight director's database and if so will be verified and or updated as necessary. Should the receiver status not be restored by the time the aircraft enters the exclusion zone then it may be placed into a holding pattern around the exclusion zone or directed away from the exclusion zone.

In a further aspect the invention broadly resides in a method of prohibiting an aircraft from entering a predetermined exclusion zone using the above mentioned avoidance system including transmitting a signal from the transmitter means;

receiving and processing the signal by the aircraft receiver means;

activation of the onboard avoidance system with the receiving and processing of the signal; and activation for engagement of the flight director system at a calculated position in relation to the exclusion zone and in accordance with the flight profile; wherein when the flight director system is engaged, the aircraft is steered away from the exclusion zone and the flight director system is disengaged at a calculated position or the avoidance system is deactivated when the signal is no longer received.

In another aspect the invention broadly resides in a method of prohibiting an aircraft from entering a predetermined exclusion zone using the above mentioned avoidance system including transmitting a signal from the transmitter means;

receiving and processing the signal by the aircraft receiver means;

activation of the onboard avoidance system with the receiving and processing of the signal; and engagement of the flight director system at a calculated position in relation to the exclusion zone and in accordance with the flight profile; wherein when the flight director system is engaged, the aircraft is steered away from the exclusion zone and the flight director system is disengaged at a calculated position or the avoidance system is deactivated when the signal is no longer received.

The signal is preferably constantly transmitted from a transmitting beacon with the same information. The operation of the transmitting beacon is preferably detected by one or more supervisory receivers as described above.

In a further aspect the invention broadly resides in a checking system for checking the operational status of an onboard aircraft system during flight preparations including a ground based transceiver; and an aircraft receiver wherein the transceiver transmits a signal to identify the system and determine its operational status and if the system is non operational then the flight director system is engaged to prevent departure of the aircraft and the relevant authorities are advised of the system status by transmission of a signal from the ground based transceiver and or aircraft transmitter.

Operational checks may be performed by comparison with standard results or last check sum of the aircraft's system that may be recorded in or retrieved from a specified information repository.

The system may be any suitable operating system such as an avoidance system. The preferred avoidance system is the system described above. A preflight avoidance systems check is preferably performed with transmission from a ground based transmitter which provides a suitable signal to identify the onboard avoidance system and conduct status check. If the system fails the flight director is engaged and prevents the aircraft from departure and the transmitter provides a signal alerting the relevant authorities that the aircraft is compromised and the aircraft is prevented from flying until the problem is rectified. When it is determined that the onboard avoidance system is not operational, a signal from the aircraft is also preferably sent to the relevant authority to inform them of its status.

In another aspect the invention broadly resides in a method of checking the operational status of an onboard aircraft system during flight preparations including transmitting a signal from the ground based transmitter; and receiving and processing the signal by an aircraft receiver wherein the transmitter transmits a signal to identify the system and determine its operational status and if the system is non operational then the flight director system is engaged to prevent departure of the aircraft and the relevant authorities are advised of the system status by transmission of a signal from the ground based transmitter and or aircraft transmitter.

BRIEF DESCRIPTION OF THE DRAWINGS

In order that the invention be more readily understood and put into practical effect, reference will now be made to the accompanying illustrations wherein.

DETAILED DESCRIPTION OF THE PREFERRED EMBODIMENT

Figure 1:
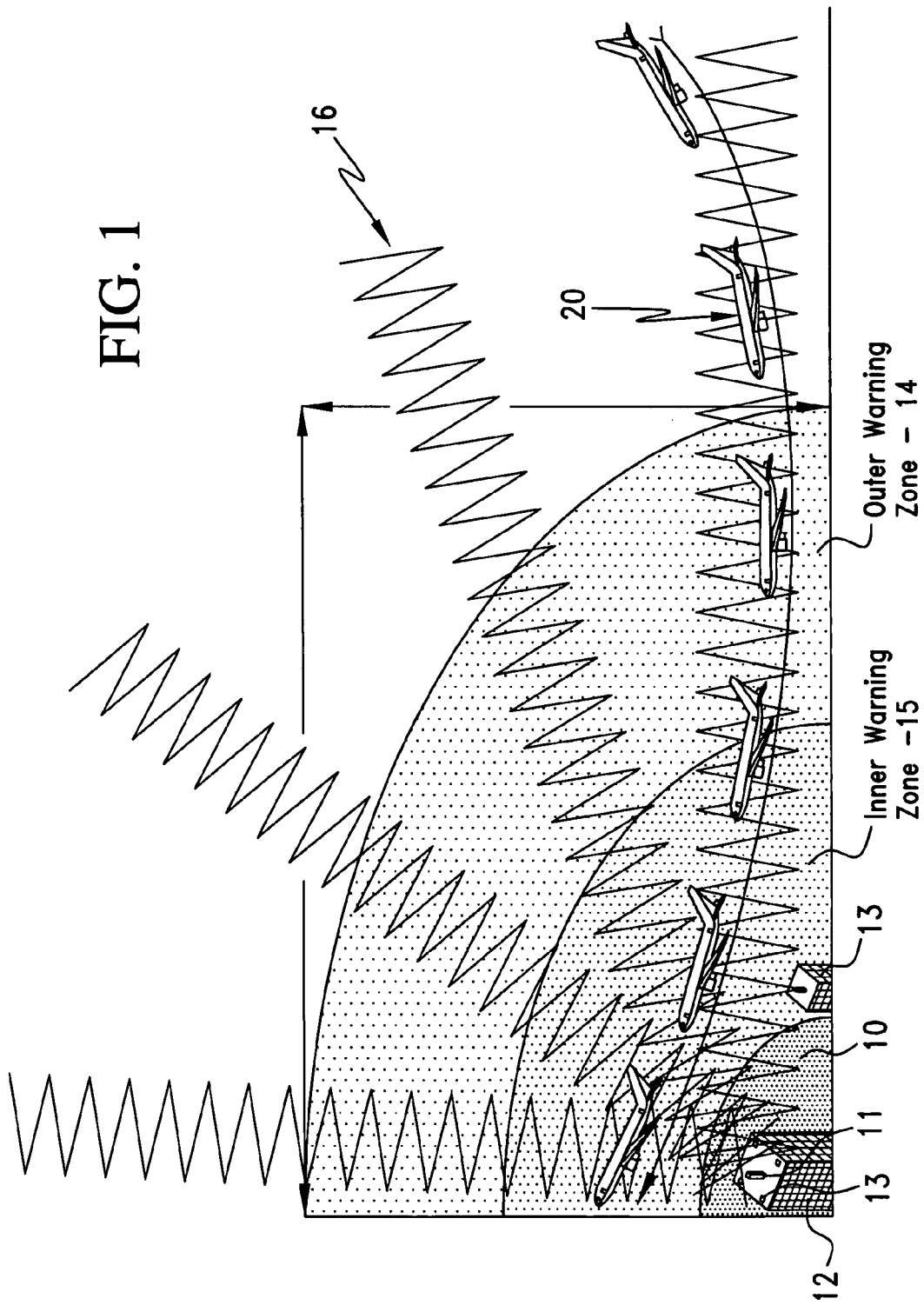
FIG. 1 is a diagrammatic representation of the exclusion zone of the preferred embodiment and the flight path of a trespassing aircraft.
Figure 2:
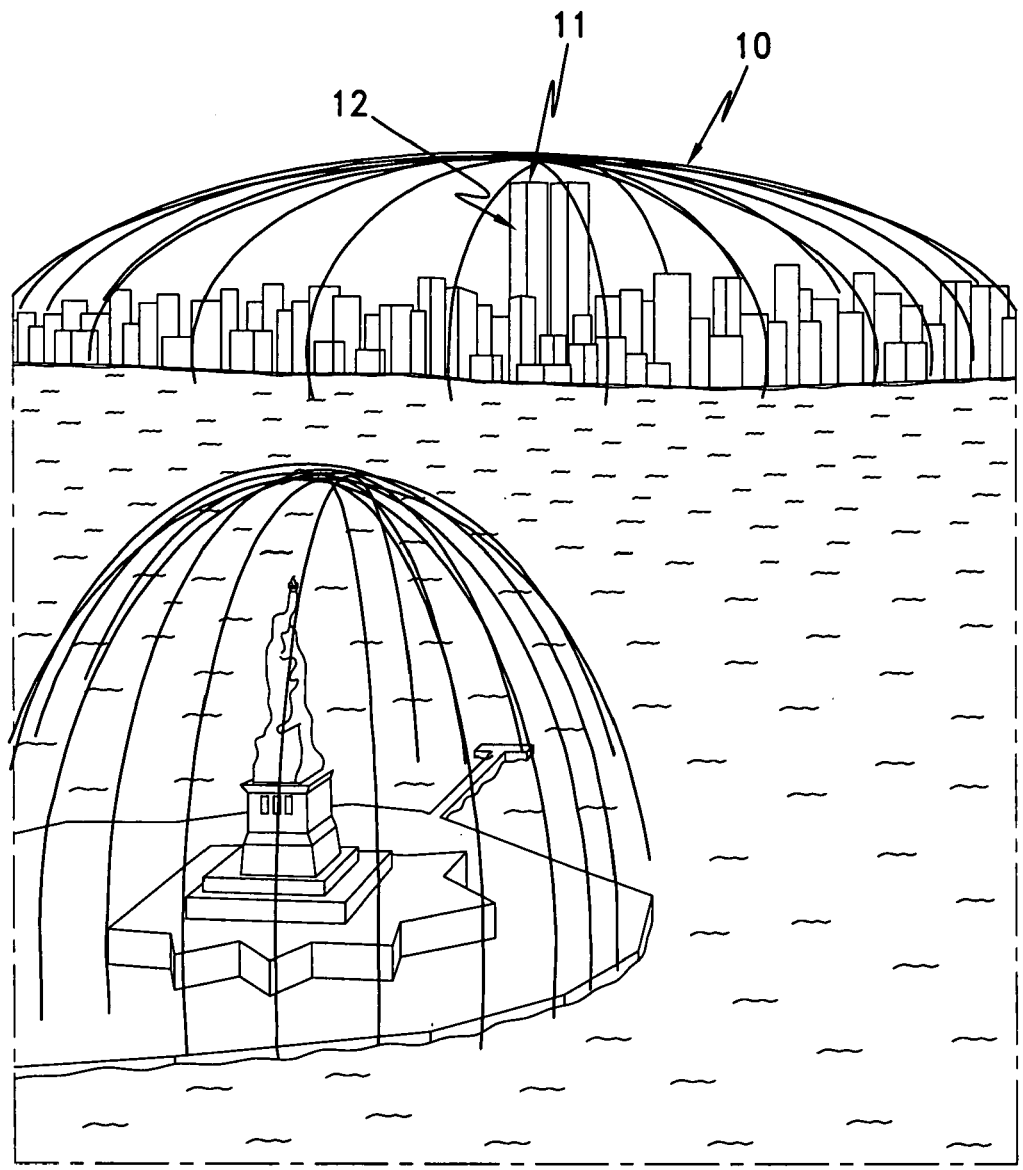
FIG. 2 is a representation of the exclusion zone about a building and buildings.

With reference to FIGS. 1 and 2, there is shown an exclusion zone 10. The exclusion zone 10 is defined by four coordinates with each coordinate having a longitude, latitude and altitude parameter. The exclusion zone 10 defines a three dimensional space. A transmitting beacon 11 is located on top of building 12 and transmits constantly a signal 16 in all directions. The signal 16 includes the beacon's identification and the exclusion zone coordinates.

The broadcasting of the signal 16 from the transmitting beacon 11 is detected by four supervisory receiver beacons 13 positioned about the transmitting beacon 11 and defining a rectangular perimeter. In other embodiments a supervisory beacon may be located on the transmitting beacon. Other supervisory receiver beacons may be remotely located. Where the supervisory beacon 13 detects that the signal 16 is not transmitted constantly it will remotely activate a secondary transmitter (not shown) on the transmitting beacon 11 and send a signal to the relevant authorities such as the Federal Aviation Authority (FAA) that the transmitting beacon 11 has failed to transmit the signal 16.

The exclusion zone 10 defines a space about the building 12. This space may take any suitable three dimensional shape but preferably defines a dome type shape. The exclusion zone 10 is bordered by an inner warning zone 15 and a outer warning zone 14. The signal transmitted from the transmitting beacon 11 is powered to extend beyond the outer warning zone 14.

When the aircraft 20 flies in range of signal reception, the onboard receiver detects the signal 16. When an aircraft 20 receives the signal 16, the signal 16 is processed by the onboard processor and the avoidance system programs are activated. The onboard avoidance system determines at what coordinate position the aircraft's flight director system is engaged and the course that the flight director system 19 steers the aircraft based on calculations involving the aircraft's flight profile, which is a dynamic description of the current status of the aircraft 20 and the position of the aircraft 20 in relation to the exclusion zone 10.

On receiving the signal 16, the aircraft avoidance system will activate the aircraft's transponder to send an alert to the relevant authorities advising that the aircraft 20 is approaching an exclusion zone 10. A transponder signal is sent irrespective of whether the transponder has been switched on in the cockpit. When the aircraft 20 passes through the outer warning zone 14, the avoidance system sounds an audible alarm in the cockpit of the aircraft 20. A further signal is sent by the transponder alerting authorities that the aircraft 20 has entered the outer warning zone 14. When the aircraft enters and passes through the inner warning zone 15, the avoidance system activates an audible and visual alarm in the cockpit of the trespassing aircraft 20. Again another signal is sent by the transponder alerting authorities to the position and situation of the aircraft 20.

At a predetermined position before the aircraft 20 reaches the exclusion zone 10, the flight director system engages, takes control of the aircraft 20 and steers the aircraft away from the exclusion zone 10. The time when the flight director system engages will differ for the different types of aircraft. In the preferred embodiment the flight director system engages and steers the aircraft 20 upwards. The flight director system steers the aircraft 20 to increase its altitude and prevents the aircraft's altitude from being decreased until it is disengaged. The engagement of the flight director system is such that the pilot has limited control in maneuvering the aircraft 20 left and right. This limited maneuverability is designed to avoid collisions with other aircraft. The flight director system disengages when the aircraft 20 reaches a predetermined position away from the exclusion zone 10. The avoidance system is deactivated when the signal is no longer received.

Figure 3:
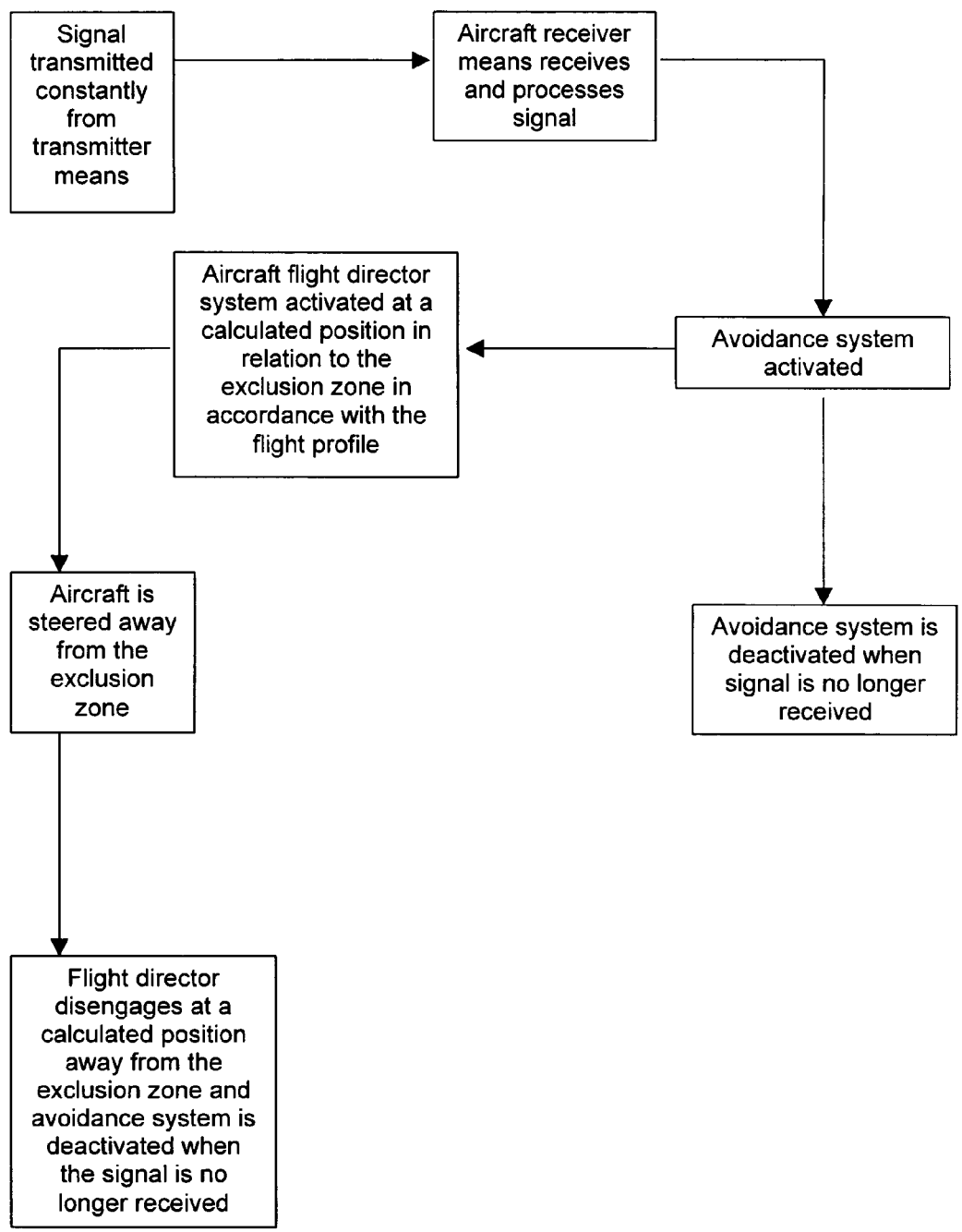
FIG. 3 is a flow diagram of the activation of the avoidance system.

FIG. 3 outlines a flow diagram of how the avoidance system operates and the method of activation and deactivation of the avoidance system.

Where the signal is not recognized or is incomplete the avoidance system immediately engages the flight director system to steer the aircraft 20 away from the exclusion zone 10.

As a security measure, the signal 16 transmitted from the transmitting beacon 11 is encrypted in a secured format. The signal 16 is also sent using direct sequence spread spectrum (DSSS) where portions of the signal 16 are broadcasted over a band of frequencies. The use of DSSS is designed to minimize the effects of attempts to jam the signal.

To avoid possible problems in landing the aircraft 20, the avoidance system encodes protocols where the avoidance system is not operational in specified zones. The preferred embodiment of the avoidance system encodes the coordinates of airports, or their runways including specified landing corridors as zones where the avoidance system is non-operational.

Figure 4:
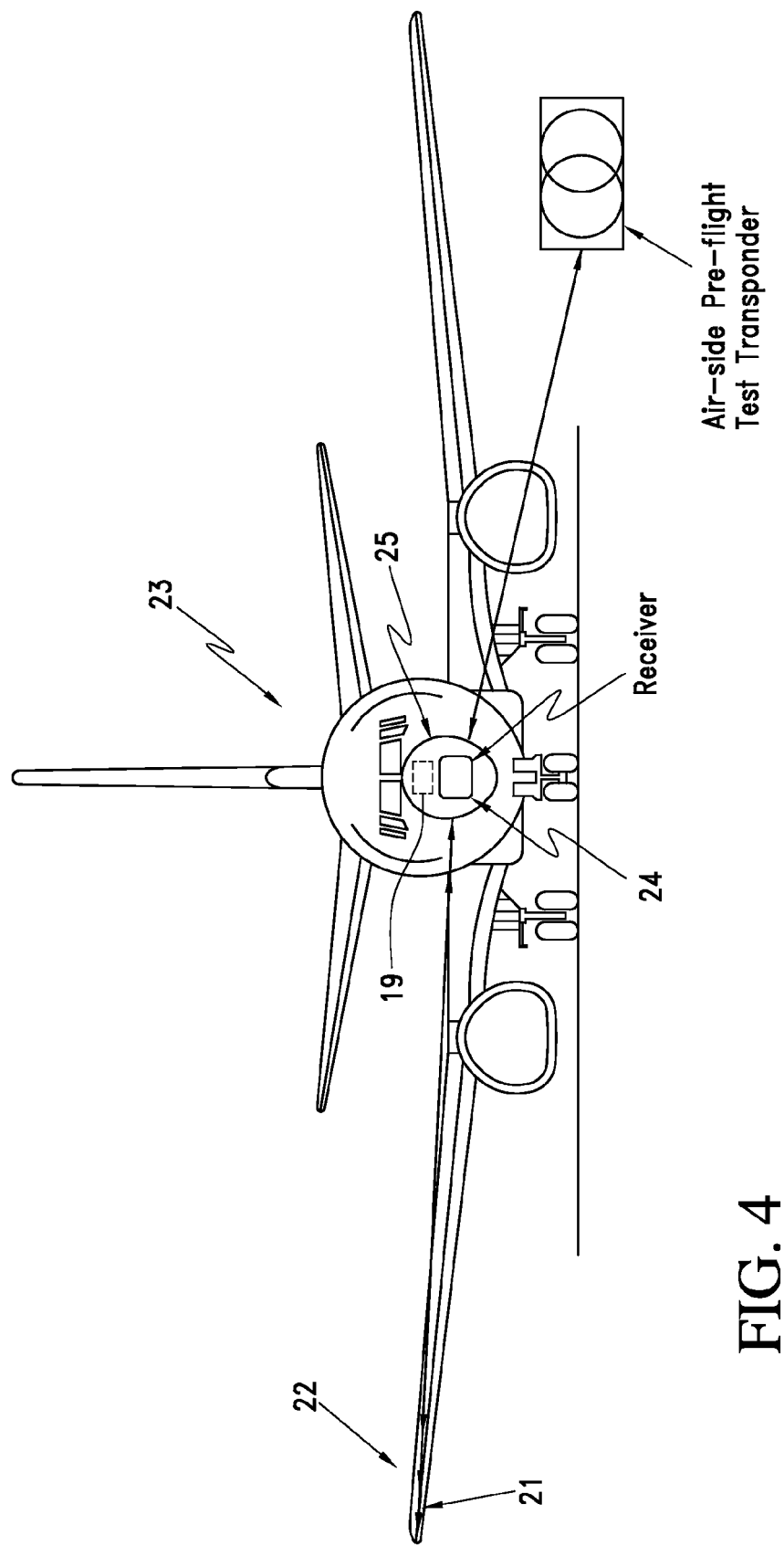
FIG. 4 is a diagrammatic representation of an aircraft's supervisory beacons for the self checking function.

To address the possibility of disablement, the avoidance system includes a self-checking system where a low power beacon is installed on the aircraft 20 to send regular signals which are received and processed to determine the operational state of the onboard avoidance system. In FIG. 4 there is shown a low power supervisory beacon transmitter 21 positioned near the wing tip 22 of aircraft 23 while a receiver and transponder 24 is positioned on the aircraft's nose 25.

Figure 5:
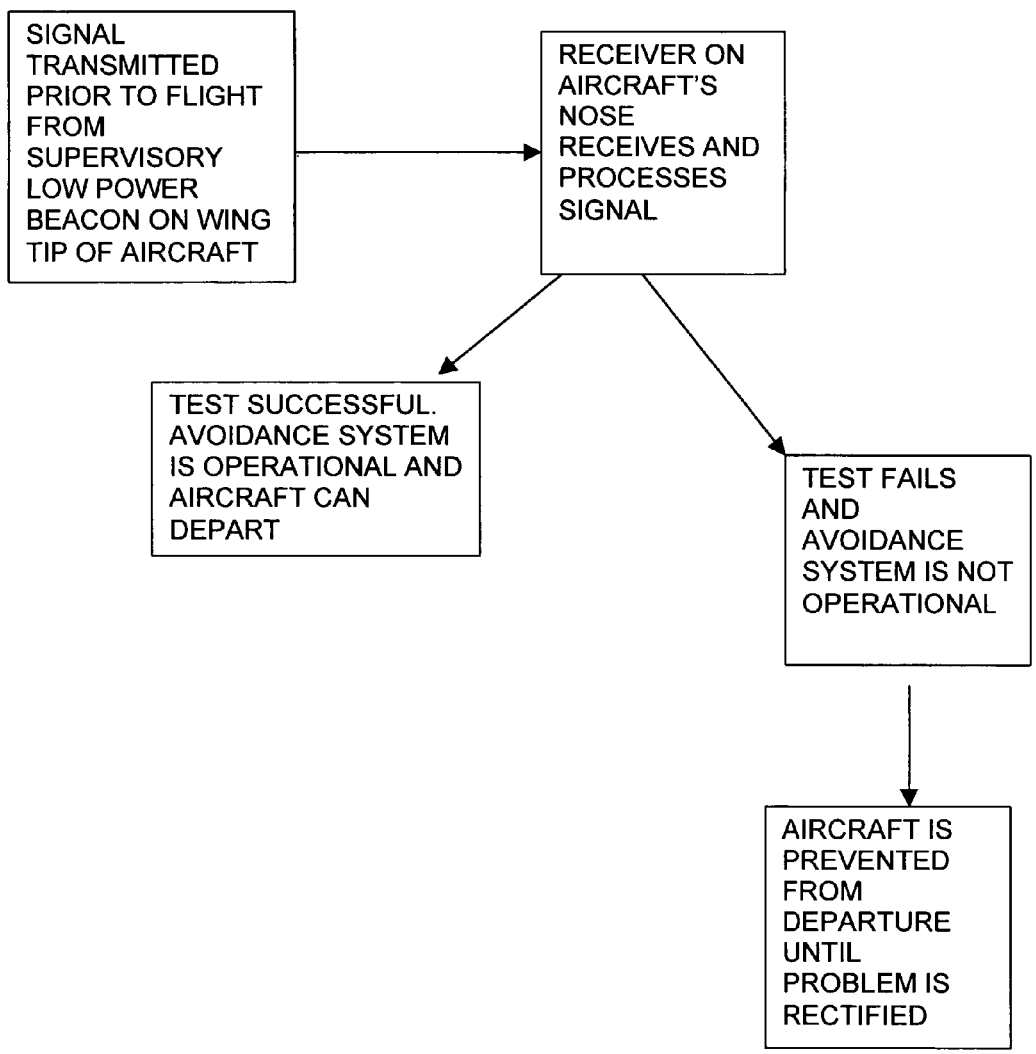
FIG. 5 is a flow diagram of the preflight diagnostic check of the avoidance system on the aircraft.
Figure 6:
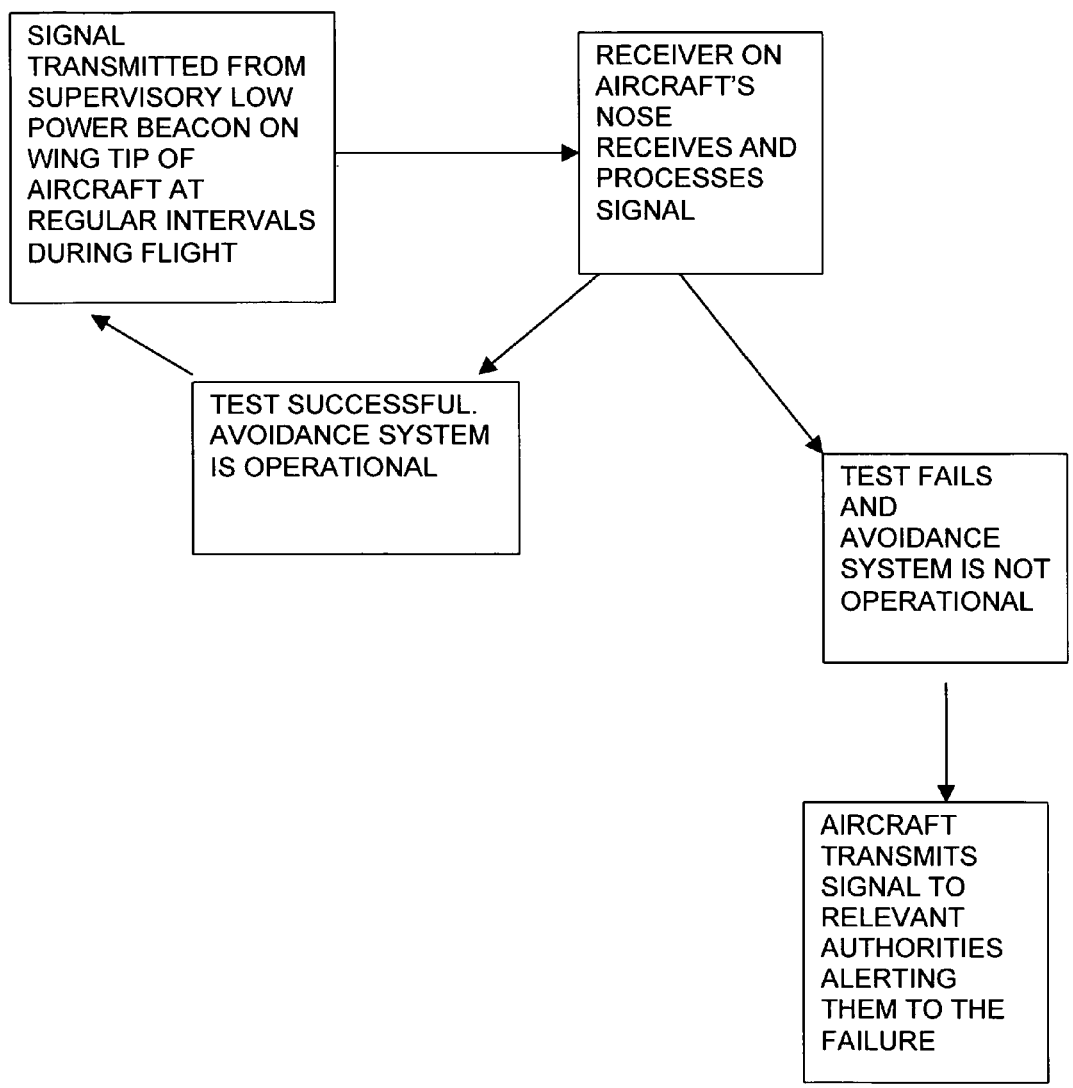
FIG. 6 is a flow diagram of the inflight diagnostic check of the avoidance system on the aircraft.

A preflight avoidance systems check is conducted prior to departure. The preflight avoidance systems check may be performed with transmission from low power supervisory beacon transmitter 21 or a ground based transmitter which provides a suitable signal to identify the onboard avoidance system and conduct status check. If the system fails the flight director is engaged and prevents the aircraft from departure and the transmitter provides a signal alerting the relevant authorities that the aircraft is compromised and the aircraft is prevented from flying until the problem is rectified. When it is determined that the onboard avoidance system is not operational, a signal from the aircraft 20 is also sent to the relevant authority to inform them of its status. A flow diagram of the procedure of a preflight systems check is shown in FIG. 5 whereas a flow diagram of an in-flight systems check is shown in FIG. 6.

The avoidance system may also encompass notification by a satellite based system to receive registered exclusion zone parameters passed directly to the flight director by another independent sub system. If the receiver means is inoperative when the aircraft enters a registered exclusion zone, the aircraft 20 will be placed in a holding pattern by the flight director system.

The use of a satellite-based system provides a back up when there is a receiver failure on the aircraft. The relevant authorities will be notified of the aircraft's current flight path and then conduct a database search to identify any exclusion zones ahead in the flight path. The exclusion zone coordinates would then be sent via satellite to the aircraft's flight director via another independent on-board sub-system to allow activation of the avoidance system. The exclusion zone may already exist in a flight directors database and if so will be verified and or updated as necessary. Should the receiver status not be restored by the time the aircraft enters the exclusion zone then it may be placed into a holding pattern around the exclusion zone or directed away from the exclusion zone.

Advantages

The present invention provides the advantage that it forces aircraft away from buildings and the like irrespective of the intentions of the pilot. Furthermore it is an proactive avoidance system that implements a response appropriate for the type of aircraft.

Variations

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

We claim:

1. An avoidance system for steering an aircraft away from an exclusion zone including transmitter means for transmitting a signal to the aircraft, said signal includes transmitter means identification and exclusion zone information;

aircraft receiver means for receiving and processing said signal, said aircraft receiver means being operationally associated with a flight director system which is programmed to control and steer the aircraft; and a self checking means including a low power beacon installed on the aircraft wherein when a transmitter means signal is received and processed by the aircraft receiver means, the flight director system is engaged in accordance with said aircraft's flight profile and processed exclusion zone information to control and steer the aircraft away from the exclusion zone;

wherein the self checking means periodically transmits a signal to the aircraft receiver means, and has means for receiving and processing said signals to determine operational state of the avoidance system.

2. An avoidance system as claimed in claim 1, wherein when a transmitter means signal is received by the receiver means, an alert signal is transmitted from the aircraft to the relevant authorities.

3. An avoidance system as claimed in claim 2, wherein said alert signal includes the aircraft identification, transmitter means identification and exclusion zone information for the transmitter means.

4. An avoidance system as claimed in claim 1, wherein when a transmitter means signal is received by the receiver means, an alert signal is transmitted from the aircraft to the relevant authorities and wherein when a signal is transmitted from the beacon and the receiver means fails to receive or process the signal, an alert signal is transmitted from the aircraft to the relevant authorities.

5. An avoidance system as claimed in claim 4, wherein the avoidance system remains activated until the signal from the transmitter means is no longer received by the aircraft receiver means.

6. An avoidance system as claimed in claim 1, wherein the avoidance system remains activated until the signal from the transmitter means is no longer received by the aircraft receiver means.

7. An avoidance system as claimed in claim 1, wherein the exclusion zone has one or more outer warning zones where an alarm is activated when the aircraft enters the warning zone.

8. An avoidance system as claimed in claim 1, wherein the aircraft receiver means engages the flight director system to take suitable action when the transmitter means signal is not recognized, partially received or jammed.

9. An avoidance system as claimed in claim 1, wherein the aircraft receiver means includes an avoidance program with protocols where the avoidance system is not operational.

10. An avoidance system as claimed in claim 1, wherein the aircraft receiver means includes an avoidance program with protocols where the avoidance system is not operational and wherein the protocols include coordinate information of airports, runways and other suitable areas for the landing and departure of the aircraft.

11. An avoidance system as claimed in claim 10, wherein the coordinate information can be amended and updated and the coordinate information is checked as part of the initializing of the avoidance system during the preparation for flight.

12. An avoidance system as claimed in claim 1, wherein the flight director system can directly receive registered exclusion zone parameters from a satellite based system for updating purposes or when there is a receiving means failure.

13. An avoidance system as claimed in claim 1, wherein a preflight check is used to determine the operational status of the avoidance system and when the receiving means fails to receive and process a preflight check signal, an alert signal is transmitted from the aircraft to alert the relevant authorities and the flight director system is engaged to prevent the aircraft from taking off.

14. An avoidance system as claimed in claim 1, wherein the flight director system is engaged at a time and position determined by the flight profile and exclusion zone information.

15. An avoidance system as claimed in claim 1, wherein the flight director system controls the upward direction of the aircraft while providing the pilot with limited sideways maneuverability.

* * * * *